United States Patent
Brunson et al.

(10) Patent No.: US 7,007,888 B2
(45) Date of Patent: Mar. 7, 2006

(54) INERTIAL POSITION TARGET MEASURING SYSTEMS AND METHODS

(75) Inventors: Richard L. Brunson, Albuquerque, NM (US); James D. Dillow, Albuquerque, NM (US); James E. Negro, Wellesley, MA (US)

(73) Assignee: The Boeing Company, Chicago, IL (US)

( * ) Notice: Subject to any disclaimer, the term of this patent is extended or adjusted under 35 U.S.C. 154(b) by 90 days.

(21) Appl. No.: 10/721,580

(22) Filed: Nov. 25, 2003

(65) Prior Publication Data
US 2005/0178876 A1 Aug. 18, 2005

(51) Int. Cl.
*F41G 7/00* (2006.01)
*G01C 21/02* (2006.01)

(52) U.S. Cl. ............ 244/3.18; 244/3.15; 244/3.16; 244/3.17; 701/207; 701/222

(58) Field of Classification Search .......... 244/3.1–3.3; 701/200, 207, 222, 226
See application file for complete search history.

(56) References Cited

U.S. PATENT DOCUMENTS

| | | | | |
|---|---|---|---|---|
| 2,941,081 A | * | 6/1960 | Greenlee et al. | 244/3.18 |
| 3,025,023 A | * | 3/1962 | Barghausen | 244/3.18 |
| 3,048,352 A | * | 8/1962 | Hansen | 244/3.18 |
| 3,301,508 A | * | 1/1967 | Yamron | 244/3.18 |
| 3,312,423 A | * | 4/1967 | Welch | 244/3.18 |
| 3,488,504 A | * | 1/1970 | Lowen et al. | 244/3.18 |
| 3,731,544 A | * | 5/1973 | Acker et al. | 244/3.18 |
| 4,306,691 A | * | 12/1981 | Boxenhorn et al. | 244/3.18 |
| 5,022,608 A | * | 6/1991 | Beam | 244/3.18 |
| 6,324,475 B1 | * | 11/2001 | Potteck | 701/222 |

* cited by examiner

*Primary Examiner*—Bernarr E. Gregory
(74) *Attorney, Agent, or Firm*—Black Lowe & Graham PLLC

(57) ABSTRACT

Systems and methods for contiguously and accurately updating target object information during an entire target engagement period are provided. The target tracking system includes a database for storing starfield information, an optical beam source configured to illuminate one or more optical beam pulses, first and second camera systems, and a processor. The processor instructs the first camera system to track the object based on recordation of the tracked object, instructs the second camera system to stabilize the tracking image based on the instructions sent to the first camera system, and determines inertial reference information of the tracked object based on the stabilized image and starfield information associated with the stabilized image.

12 Claims, 5 Drawing Sheets

INERTIAL POSITION TARGET MEASURING SYSTEMS AND METHODS

FIELD OF THE INVENTION

This invention relates generally to target tracking and, more specifically, to systems and methods for accurately identifying the inertial position of a target.

BACKGROUND OF THE INVENTION

When line of sight tracking is used to determine the inertial position of objects, accuracy and engagement, timelines may be difficult to achieve. In one approach, an inertial reference unit (IRU) star calibration update is performed before and after the engagement sequence thereby requiring a longer engagement timeline. When star calibration is performed before and after the engagement is performed, the IRU information diverges between the calibrations, thereby, resulting in degraded inaccurate target object position accuracy.

One process to generate more accurate information of the target object would be to temporarily suspend tracking of the target object during the time of engagement. While tracking is suspended, an IRU star calibration update is performed. However, suspension of tracking during an engagement period may be problematic. For example, if the target object changes course during the suspension, then reacquiring the target object may become difficult.

However, there exists an unmet need to provide contiguous, accurate target object information during an entire target engagement period.

SUMMARY OF THE INVENTION

The present invention provides systems and methods for contiguously and accurately updating target object information during an entire target engagement period. The accurate target object information is used to instruct a weapon or defense system about the target.

In an embodiment of the present invention, an exemplary target tracking system includes a database for storing starfield information, an optical beam source configured to illuminate one or more optical beam pulses, first and second camera systems, and a processor. The processor instructs the first camera system to track the object based on recordation of the tracked object, instructs the second camera system to stabilize the tracking image based on the instructions sent to the first camera system, and determines inertial reference information of the tracked object based on the stabilized image and starfield information associated with the stabilized image.

In one aspect of the invention, one or more platform information sources may be coupled to the target tracking system to send platform information to the target tracking system for use in determining inertial reference information of the tracked object.

In another aspect of the invention, the system may be hosted on a platform that may include satellite, an aircraft, or a ground based system.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
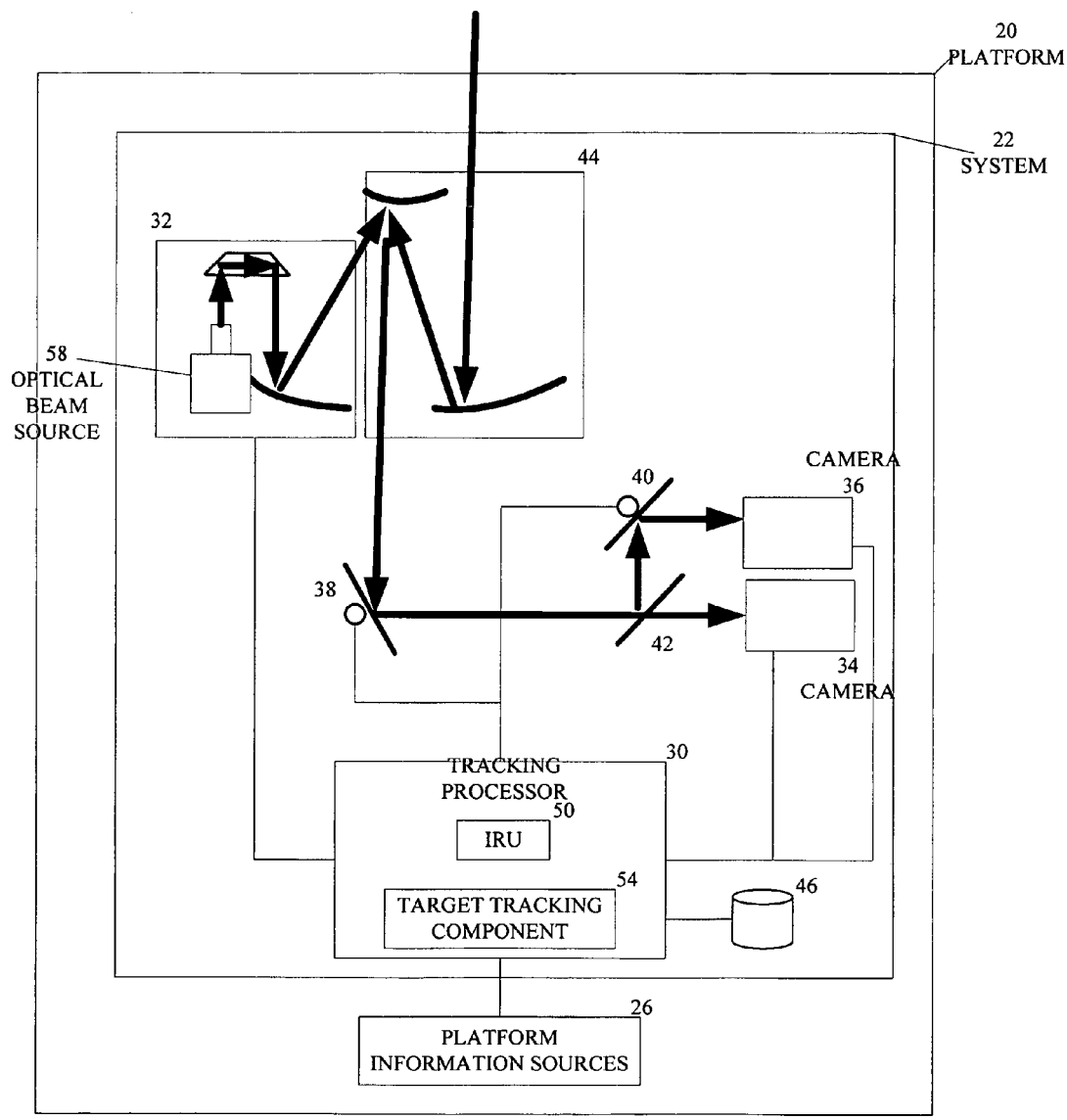
FIG. 1 is a block diagram of an exemplary target tracking system formed in accordance with an embodiment of the present invention.

Referring to FIG. 1, a target tracking system 22 included within a platform 20, such as without limitation a ground based facility, an aircraft, or a satellite, provides near continuous updating of inertial reference unit (IRU) information while performing uninterrupted optical target tracking. In addition, the platform 20 includes platform information sources 26, such as a flight data computer, and an Inertial Reference System (IRS) that are coupled to the target tracking system 22.

In one embodiment, the target tracking system 22 includes a tracking processor 30, a high signal light source component 32, a first camera 34, a second camera 36, a first fast steering mirror (FSM) 38, a second FSM 40, a beam splitter 42, and various reflecting mirrors 44. The tracking processor 30 is operatively coupled to the high signal light source component 32, the first and second cameras 34 and 36, the first and second FSMs 38 and 40, and a database 46. The database 46 stores starfield reference information for use by the processor 30.

The tracking processor 30 includes an inertial reference unit (IRU) 50. The IRU 50 determines and adjusts inertial reference information received from the IRS based on an optical output of an optical beam source 58 of the high signal light source component 32 and an image received by the second camera 36. In addition, the tracking processor 30 includes a target tracking component 54 that tracks a target displayed within an image generated by the first camera 34 and determines inertial reference information of the tracked target based on the inertial reference information determined by the IRU 50 and any information from the sources 26. The target tracking component 54 generates an instruction to the second FSM 40 for stabilizing the tracked image, thereby allowing the second camera 36 to record a stabilized image of the starfield. The IRU 50 may be located remote from the processor 30 or the target tracking system 22.

Figure 2:
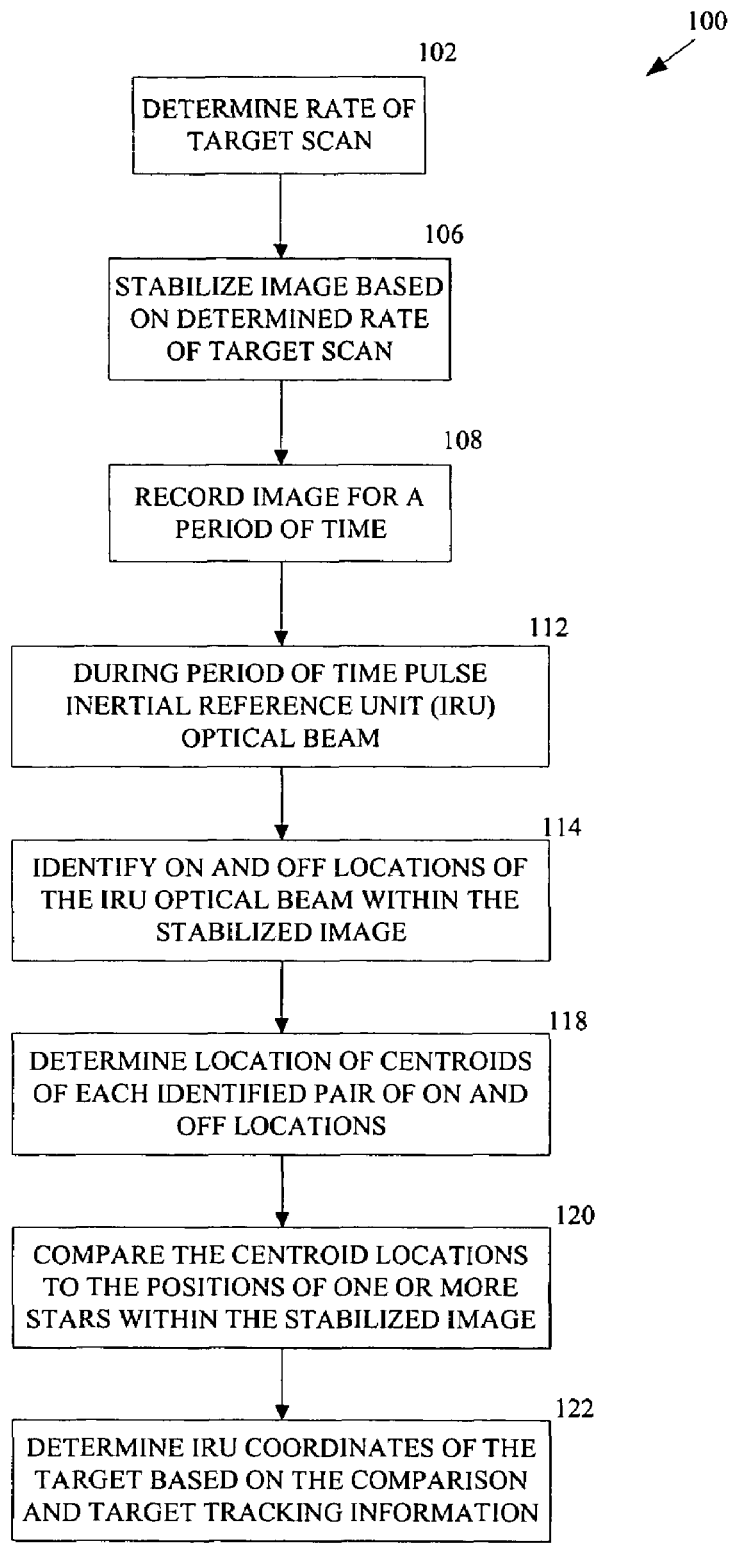
FIG. 2 illustrates an exemplary process performed by the system of FIG. 1.

Referring now to FIG. 2, a process 100 performed by the target tracking system 22 (FIG. 1) provides nearly continuous inertial reference information updating using starfield information stored in the database 46 without loss of contact of an optically tracked target. The process 100 begins after the target tracking system 22 has acquired a target in its view. In other words, the first camera 34 has acquired a target within its field of view and the target tracking component 54 has analyzed images generated by the first camera 34 and instructed the first FSM 38 to track the identified target. The process 100 begins at a block 102 where the target tracking component 54 determines the inertial angular rate of the target scan. The target scan inertial angular rate is the speed at which the first FSM 38 moves in order to track the target. At a block 106, the starfield image received by the second camera 36 is stabilized based on the determined target scan rate. The determined target scan rate is sent to the second FSM 40 for de-scanning the starfield image received from the first FSM 38.

Figure 3:
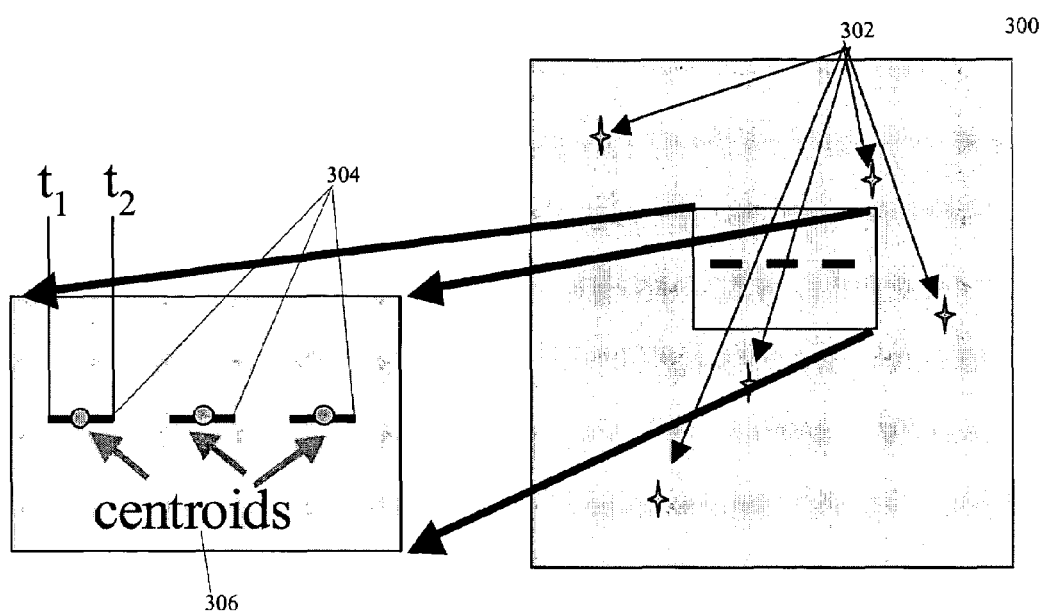
FIG. 3 illustrates a geometric representation of an analysis performed by the system of FIG. 1.

Referring back to FIG. 2, at a block 108 the second camera 36 records the stabilized image over a predetermined period of time. At a block 112, during the period of time that the second camera 36 records the starfield image, the IRU optical beam generator 58 generates an optical beam that is pulsed over a finite period of time. At a block 114, the tracking processor 30 or components thereof identifies the location within the stabilized image of when the IRU optical beam was turned on and off during each optical beam pulse. Referring to FIG. 3, time $t_1$, identifies the location within a stabilized image 300 where an optical beam pulse was initiated and time $t_2$ is the location within the image 300 that identifies when the IRU optical beam pulse was turned off. Referring back to FIG. 2, at a block 118, centroids of each optical beam pulse are determined based on respective times $t_1$ and $t_2$.

At a block 120, the processor 30 compares the centroids to one or more stars located within the stabilized image based on starfield information stored in the database 46 and adjusts inertial reference information received from the IRU 50 based on the comparison. At a block 122, the processor 30 determines inertial reference information for the target based on present target tracking information produced by the target tracking component 54, the adjusted inertial reference information, and any information relating to the platform 20, such as without limitation GPS location information, pitch, roll, yaw, or other orientation information received from the other sources 26. Platform information may include position, velocity, and attitude from separate inertial navigation system for transforming target position into a platform body-fixed coordinate system.

In one embodiment, the optical beam direction is referenced to the target based on target tracking information generated by the target tracking component 54 and sent to the light source component 32. Because the optical beam is referenced to the tracked target, the pulses track across a stabilized image.

Referring now to FIG. 3, a stabilized image 300 includes a plurality of stars 302 that are identified by a starfield analysis component included within the tracking processor 30. The stabilized image 300 includes a plurality of optical beam pulses recorded by the second camera 36. Centroids 306 of each optical beam pulse 304 are identified based on identified $t_1$, and $t_2$ of the respective pulse 304. The centroids 306 are simply the center location of each pulse 304. The processor 30 determines the location of the centroids 306 relative to the starfield pattern 302 within the stabilized image 300 in order to generate highly accurate inertial reference update information of the target.

Figure 4:
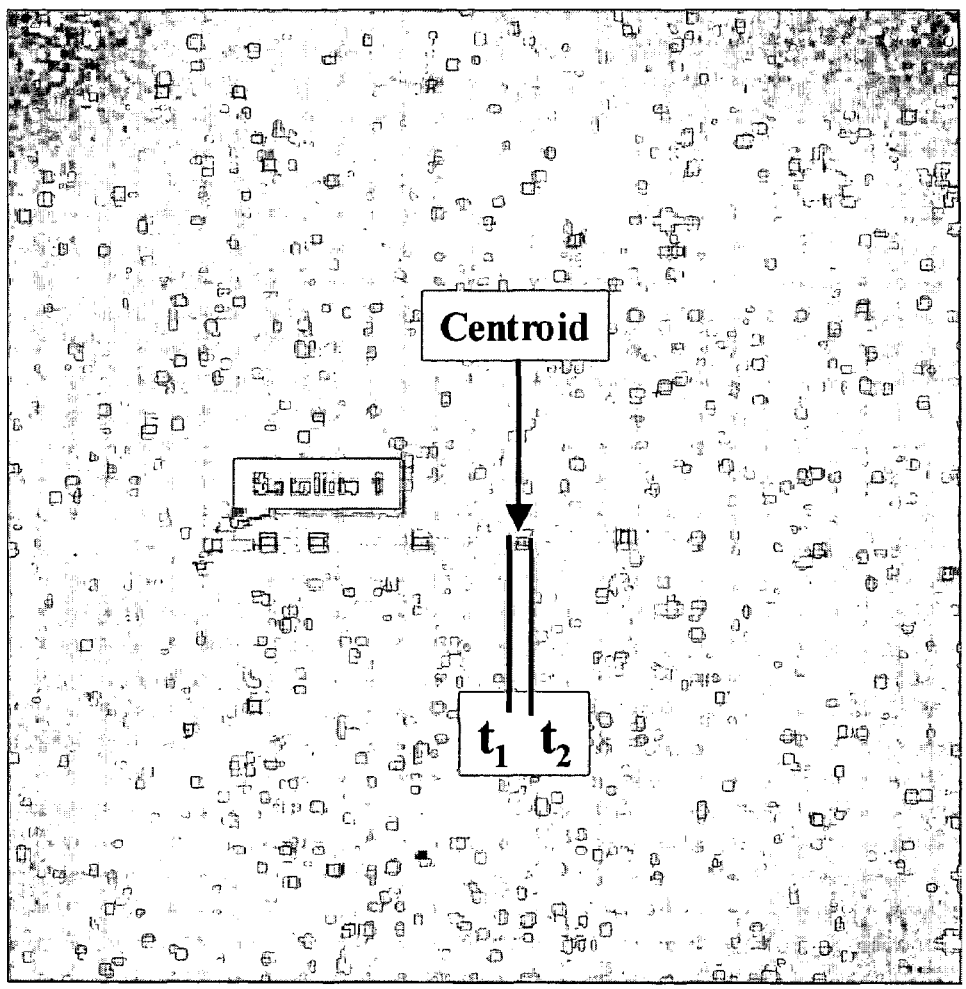
FIG. 4 illustrates an exemplary stabilized image generated by a component of the system of FIG. 1 for analyzing inertial reference information.

FIG. 4 illustrates an exemplary de-scanned (stabilized) image that is recorded by the second camera 36. Satellite 1 is a tracked target.

The resulting series of pulses from the beam combined with the knowledge of the precise time of each pulse allows accurate measurement of the optical beam pointing direction relative to the starfield. This measurement is input to a Kalman Filter which estimates the IRU errors, thereby allowing accurate reporting of the track object position in inertial frame coordinates. The Kalman Filter algorithm is a standard, recognized estimation algorithm for estimating IRU errors. The Kalman Filter would be applied in the same manner as if the track were interrupted and the star measurements taken independent of the track process. The errors in the inertial system which would be estimated are the three components of inertial attitude, the three components of gyro bias, and the 3 components of gyro scalefactor. The Kalman Filter would therefore be at least a 9 state estimation algorithm. The equations for the Kalman Filter are given in the literature but are shown here for completeness:

$$K_n = P_n H_n^T (H_n P_n H_n^T + R)^{-1} \quad \text{Kalman Gain}$$
$$x_{n+1} = x_n + K_n(z_n - H_n x_n) \quad \text{State Update}$$
$$P_{n+1} = P_n - K_n H_n P_n \quad \text{Co variance Update}$$

$K_n = 9 \times 9$ Initial Co variance Matrix (Identity),
$H_n = 2 \times 9$ Measurement Matrix,
$P_0 = 9 \times 9$ Initial Co variance Matrix (Identity),
$R = 2 \times 2$ Measurement Noise Matrix
$x_o = 9 \times 1$ State Vector (Zero Vector)
$z_n = 2 \times 1$ Measurement Vector
(Inertial Angles to Each Star Observed)

The Kalman Filter equations are iterated over each exposure time of the streak camera 36 with a star measurement comprising the $Z_n$ vector at each exposure time.

The optical beam has a signal-to-noise ratio of approximately 100. The beam can be very intense relative to the signal returned from the target, thereby allowing centroid measurement of the optical beam streaks to approximately $\frac{1}{100}$ of the camera 36 pixel angular extent.

Figure 5:
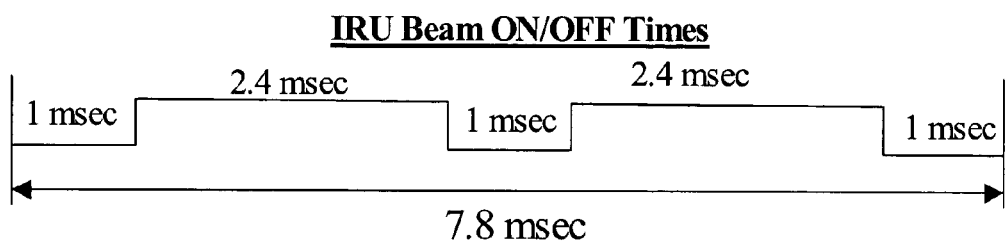
FIG. 5 is a time graph of a modulated optical beam used in the system of FIG. 1.

Referring to FIG. 5, a time graph 350 illustrates example on/off times of an optical beam. The following are exemplary system values associated with the graph 350:

Aperture size: 50 cm (mirror #44)
Optical Magnification=$10_x$ 1(mirror #44)
Slew Rate ($\omega$): 1 degree/second 917.4 mrad/sec) (system #22)
Second camera 36
  1 degree field-of-view
  4096×4096 array
  4.25 $\mu$rads IFOV
Optical beam pulse repetition frequency: 300 hz
Angular length of each streak (pulse): 10 pixels (42.5 $\mu$rads)
Time length of each pulse: $42.5 \times 10^{-6}/17.4 \times 10^{-3} = 2.4$ msec
De-scan time=7.8 msec (assuming two complete pulses in scan time)
Required De-scan FSM 40 angle range=$7.8 \times 10^{-3} \times 17.4 \times 10^{-3} \sim 136$ $\mu$grads (output space)

While the preferred embodiment of the invention has been illustrated and described, as noted above, many changes can be made without departing from the spirit and scope of the invention. Also, the steps in the process 100 may be performed in various order. Accordingly, the scope of the invention is not limited by the disclosure of the preferred embodiment. Instead, the invention should be determined entirely by reference to the claims that follow.

What is claimed is:
1. A targeting platform comprising:
   a target tracking system including:
      a database for storing starfield information;
      an optical beam source configured to illuminate one or more optical beam pulses;
      a first camera system configured to track an object and record the tracked object;

a second camera system configured to stabilize a tracking image received by a portion of the first camera system and record the stabilized image that includes the one or more optical beam pulses; and a processor coupled to the database, the optical beam source, and the first and second camera systems, the processor including:
- a first component configured to instruct the first camera system to track the object based on recordation of the tracked object;
- a second component configured to instruct the second camera system to stabilize the tracking image based on the instructions sent to the first camera system; and
- a third component configured to determine inertial reference information of the tracked object based on the stabilized image and starfield information associated with the stabilized image.

2. The platform of claim 1, further comprising:

one or more platform information sources coupled to the target tracking system, the one or more platform information sources being configured to send platform information to the target tracking system, wherein the third component is configured to further determine inertial reference information based on platform information.

3. The platform of claim 1, wherein the first camera system includes:
- a first fast steering mirror configured to track the object based on instructions from the first component; and
- a first camera configured to record an image reflected by the fast steering mirror and send the recorded image to the first component.

4. The platform of claim 3, wherein the second camera system includes:
- a second fast steering mirror configured to stabilize the image reflected by the first fast steering mirror based on instructions sent from the second component; and
- a second camera configured to record an image reflected by the second fast steering mirror and send the recorded image to the third component.

5. The platform of claim 1, wherein the platform is a satellite.

6. The platform of claim 1, wherein the platform is an aircraft.

7. The platform of claim 1, wherein the platform is a ground based system.

8. The platform of claim 7, wherein the ground based system is a vehicle.

9. A target tracking system comprising:

a database for storing starfield information;

an optical beam source configured to illuminate one or more optical beam pulses;

a first camera system configured to track an object and record the tracked object;

a second camera system configured to stabilize a tracking image received by a portion of the first camera system and record the stabilized image that includes the one or more optical beam pulses; and a processor coupled to the database, the optical beam source, and the first and second camera systems, the processor including:
- a first component configured to instruct the first camera system to track the object based on recordation of the tracked object;
- a second component configured to instruct the second camera system to stabilize the tracking image based on the instructions sent to the first camera system; and
- a third component configured to determine inertial reference information of the tracked object based on the stabilized image and starfield information associated with the stabilized image.

10. The system of claim 9, wherein the third component is configured to further determine inertial reference information based on received platform information.

11. The system of claim 9, wherein the first camera system includes:
- a first fast steering mirror configured to track the object based on instructions from the first component; and
- a first camera configured to record an image reflected by the fast steering mirror and send the recorded image to the first component.

12. The system of claim 11, wherein the second camera system includes:
- a second fast steering mirror configured to stabilize the image reflected by the first fast steering mirror based on instructions sent from the second component; and
- a second camera configured to record an image reflected by the second fast steering mirror and send the recorded image to the third component.

* * * * *